US008023128B2

(12) United States Patent
Hamada

(10) Patent No.: US 8,023,128 B2
(45) Date of Patent: Sep. 20, 2011

(54) IMAGE PROCESSING APPARATUS AND IMAGE PROCESSING METHOD

(75) Inventor: Noboru Hamada, Kawasaki (JP)

(73) Assignee: Canon Kabushiki Kaisha (JP)

( * ) Notice: Subject to any disclaimer, the term of this patent is extended or adjusted under 35 U.S.C. 154(b) by 870 days.

(21) Appl. No.: 12/039,383

(22) Filed: Feb. 28, 2008

(65) Prior Publication Data

US 2008/0232703 A1 Sep. 25, 2008

(30) Foreign Application Priority Data

Mar. 22, 2007 (JP) ................. 2007-074785

(51) Int. Cl.
G06K 15/00 (2006.01)
H04N 1/40 (2006.01)
(52) U.S. Cl. ...................... 358/1.14; 358/3.28
(58) Field of Classification Search .......... 382/232, 382/100; 358/443, 448, 2.1, 1.9, 3.26, 3.28, 358/1.12
See application file for complete search history.

(56) References Cited

U.S. PATENT DOCUMENTS

| | | | | | |
|---|---|---|---|---|---|
| 7,305,104 | B2 * | 12/2007 | Carr et al. | ...................... | 382/100 |
| 7,421,124 | B2 * | 9/2008 | Kitora et al. | ................... | 382/181 |
| 2003/0126434 | A1 * | 7/2003 | Lim et al. | ...................... | 713/164 |
| 2003/0231785 | A1 * | 12/2003 | Rhoads et al. | ................ | 382/100 |
| 2004/0028284 | A1 * | 2/2004 | Schwartz et al. | ............. | 382/251 |
| 2005/0207615 | A1 * | 9/2005 | Stach | ............................ | 382/100 |
| 2007/0030521 | A1 * | 2/2007 | Fujii et al. | ..................... | 358/3.28 |
| 2007/0080249 | A1 * | 4/2007 | Hamasuna et al. | ............. | 241/36 |
| 2008/0049971 | A1 * | 2/2008 | Ramos et al. | ................. | 382/100 |
| 2008/0149724 | A1 * | 6/2008 | Nishizawa | ............... | 235/462.11 |
| 2008/0292133 | A1 * | 11/2008 | Planitz et al. | ................. | 382/100 |
| 2010/0197271 | A1 * | 8/2010 | Yoshikawa et al. | ........... | 455/411 |

FOREIGN PATENT DOCUMENTS

| | | |
|---|---|---|
| JP | 2004-303223 A | 10/2004 |
| JP | 2005-062969 A | 3/2005 |
| JP | 2005-63454 A | 3/2005 |
| JP | 2006-074123 A | 3/2006 |
| JP | 2006-080939 A | 3/2006 |

OTHER PUBLICATIONS

Official Notice of Rejection issued in corresponding Japanese Patent Application No. 2007-074785 dated Jan. 22, 2010.
Office Action: Notice of Rejection issued in corresponding Japanese Patent Application No. 2007-074785 dated Apr. 28, 2009.

* cited by examiner

*Primary Examiner* — Jerome Grant, II
(74) *Attorney, Agent, or Firm* — Rossi, Kimms & McDowell LLP

(57) ABSTRACT

An object is to provide a user with various options on a processing method of an original document including a code image. To accomplish the object, the image processing apparatus includes a decoding section for extracting information by decoding the code image contained in the original document image, and a decision section for making a decision according to selection of the user as to whether to output the original document image or the information extracted by the decoding section.

6 Claims, 18 Drawing Sheets

IMAGE PROCESSING APPARATUS AND IMAGE PROCESSING METHOD

BACKGROUND OF THE INVENTION

1. Field of the Invention

The present invention relates to an image processing apparatus and image processing method capable of handling a code image.

2. Description of the Related Art

Attempts to utilize paper as a medium of digital data have come to be made by generating a code image by encoding information like digital data using an encoding means like a bar code, and by printing the code image on the paper.

To extract the original information from the paper on which the code image is printed, the code image printed on the paper is read by an optical reading means like a scanner, and the original information is extracted by decoding the code image.

An example of such a system is disclosed in Japanese Patent Laid-Open No. 2005-63454.

In addition, Japanese Patent Laid-Open No. 2004-303223 describes that a password system is applicable for the security at the decoding.

Further features of the present invention will become apparent from the following description of exemplary embodiments (with reference to the attached drawings).

SUMMARY OF THE INVENTION

Thus, Japanese Patent Laid-Open Nos. 2005-63454 and 2004-303223 describe technology for improving the convenience of a user who needs information in the code image.

In practice, however, there are not only users who need information in the code image, but also users who need image information about the entire original document image including the code image.

The foregoing Japanese Patent Laid-Open Nos. 2005-63454 and 2004-303223, however, lack perspective on the latter case, that is, the convenience of the user, thereby impairing the convenience of the user.

To solve the foregoing problem, the image processing apparatus in accordance with the present invention is characterized by having a decoding means for extracting information by decoding a code image contained in an original document image; and a decision means for making a decision according to selection of a user as to whether to output the original document image or the information extracted by the decoding means.

The foregoing means in accordance with the present invention can provide the user with an easy to use apparatus capable of decoding the code image.

Further features of the present invention will become apparent from the following description of exemplary embodiments with reference to the attached drawings.

DESCRIPTION OF THE EMBODIMENTS

The best mode for implementing the present invention will now be described with reference to the accompanying drawings.

Embodiment 1

<Image Processing System (FIG. 1)>

Figure 1:
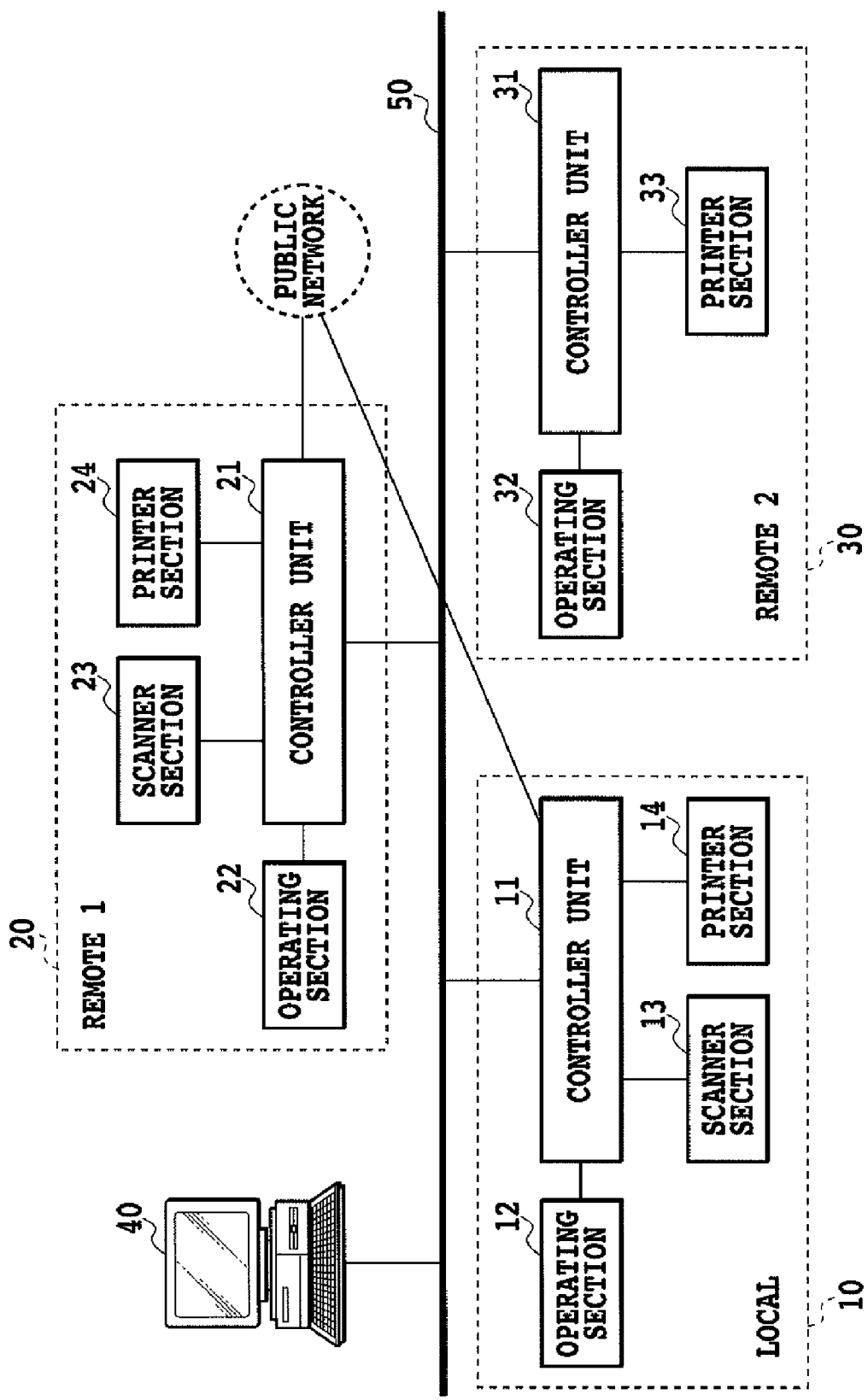
FIG. 1 is a diagram showing an outline of an image processing apparatus in accordance with the present invention.

An embodiment 1 will be described in detail below with reference to the drawings. FIG. 1 is a block diagram showing the image processing apparatus of an embodiment in accordance with the present invention. The following is a detailed description of FIG. 1.

The image processing system as shown in FIG. 1 has a host computer 40 and three image forming apparatuses 10, 20 and 30 connected to a LAN 50. The image processing system in accordance with the present invention, however, is not limited to these numbers of devices connected. In addition, although the present embodiment employs the LAN as a connecting method, it is not limited to that. For example, any networks such as a WAN (public network), serial transmission systems such as a USB, and parallel transmission systems such as a Centronics interface and SCSI are applicable.

A host computer (called "PC" from now on) 40 has functions of a personal computer. In addition, the PC 40 can transmit and receive a file or e-mail via the LAN 50 or WAN using FTP or SMB protocol. Furthermore, the PC 40 can issue a printing instruction to the image forming apparatus 10, 20 or 30 via a printer driver.

The image forming apparatus 10 is same as the image forming apparatus 20. The image forming apparatus 30, which is an image forming apparatus having only a printing function, does not have a scanner section the image forming apparatus 10 or 20 has. In the following description, the image forming apparatus 10 in the image forming apparatuses 10 and 20 will be described in detail with placing the focusing on it for the sake of simplicity.

The image forming apparatus 10 comprises a scanner section 13, a printer section 14, a controller (Controller Unit) 11, and an operating section 12. Here, the scanner section 13 is an image input device, and the printer section 14 is an image output device. The controller (Controller Unit) 11 controls the operation of the image forming apparatus 10 in its entirety, and the operating section 12 constitutes a user interface (UI).

Incidentally, the term "image processing apparatus" in the present specification refers to an apparatus capable of carrying out image processing (such as the controller 11).

<Image Forming Apparatus 10 (FIG. 2)>

Figure 2:
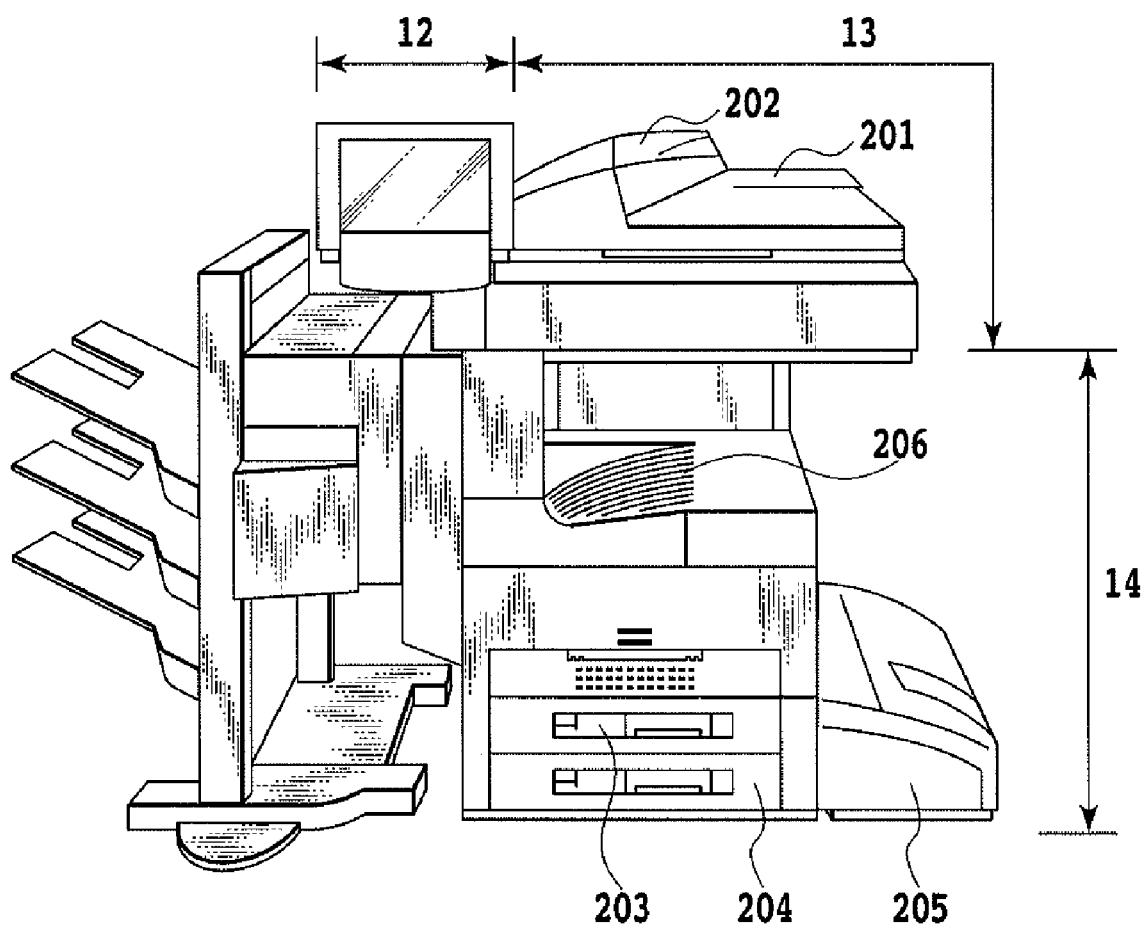
FIG. 2 is an exterior view of input/output devices of the image forming apparatus.

FIG. 2 shows an external appearance of the image forming apparatus 10. The following is a detailed description about FIG. 2.

The scanner section 13 converts image information into an electric signal by inputting to a CCD the reflected light obtained by performing exposure scanning of the image on an original document. The scanner section 13 further converts the electric signal to a luminance signal consisting of R, G, and B colors, and supplies the luminance signal to the controller 11 as image data.

The original document is placed on a tray 202 of a document feeder 201. When a user instructs to start reading from the operating section 12, the controller 11 gives the scanner section 13 an original document read command. Receiving the command, the scanner section 13 feeds the original document one by one from the tray 202 of the document feeder 201, and reads the original document. As for the reading method of the original document, instead of the automatic feeding method using the document feeder 201, a method is also possible which scans the original document by placing it on a glass plate not shown and by moving an exposure section.

The printer section 14 is an image forming device for forming image data received from the controller 11 on paper. In the present embodiment, although the image forming system consists of an electrophotographic system using a photoconductive drum or a photoconductive belt, the present invention is not limited to it. For example, an ink-jet system is also applicable which expels inks from a minute nozzle array to print on paper. The printer section 14 includes a plurality of paper cassettes 203, 204, and 205, which enable selection of a different paper size or different paper direction. A paper output tray 206 receives paper after printing.

In FIG. 1, the image forming apparatus 20 comprises a scanner section 23, a printer section 24, a controller (Controller Unit) 21, and an operating section 22. Here, the scanner section 23 is an image input device, and the printer section 24 is an image output device. In addition, the controller (Controller Unit) 21 controls the operation of the image forming apparatus 20 in its entirety, and the operating section 22 constitutes a user interface (UI).

In FIG. 1, the image forming apparatus 30 comprises a printer section 33, a controller (Controller Unit) 31, and an operating section 32. Here, the printer section 33 is an image output device. In addition, the controller (Controller Unit) 31 controls the operation of the image forming apparatus 30 in its entirety, and the operating section 32 constitutes a user interface (UI).

<Detailed Description of Controller 11 (FIG. 3)>

Figure 3:
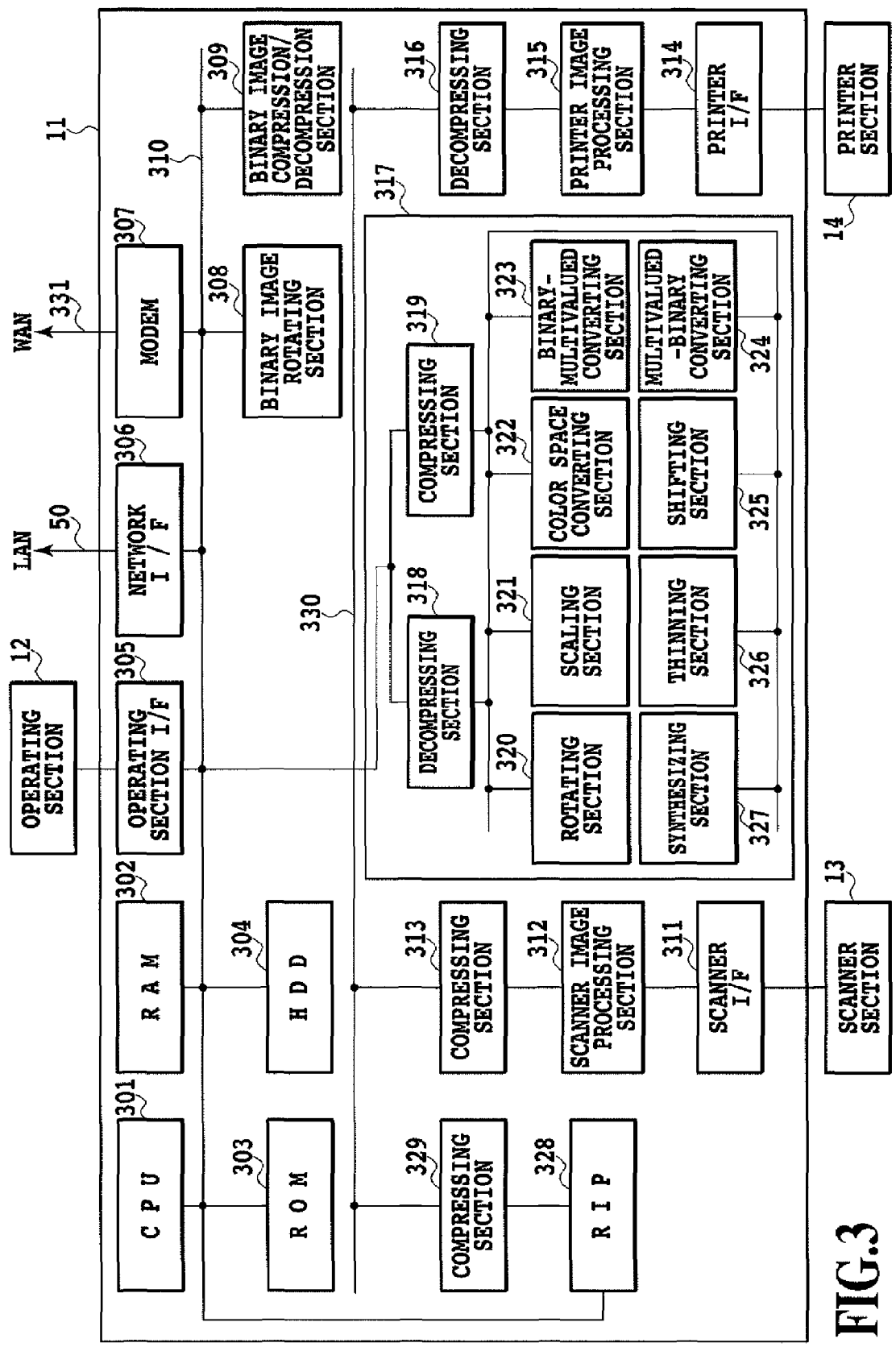
FIG. 3 is a block diagram showing an outline of the image forming apparatus.

FIG. 3 is a block diagram for describing the controller 11 of the image forming apparatus 10 in more detail. The following is a detailed description about FIG. 3.

The controller 11 is electrically connected to the scanner section 13 and printer section 14 on one hand, and to the PC 40 or external apparatus via the LAN 50 or WAN 331 on the other hand. This enables the input and output of the image data and device information.

A CPU 301 achieves centralized control of accesses to individual devices connected thereto according to control programs and the like stored in a ROM 303, and centralized control of various processings carried out inside the controller 11. A RAM 302, which is a system work memory for the CPU 301 to operate, is also a memory for temporarily storing image data. The RAM 302 consists of a SRAM that retains the stored contents after the power off and a DRAM whose contents are erased after the power off. The ROM 303 stores a boot program and the like of the apparatus. An HDD 304 is a hard disk drive capable of storing system software and image data.

In the following description of the embodiments, the term "box" or "box save" refers to saving information to a storage medium such as the HDD 304 to enable printing or transmission when a user issues an instruction later.

An operating section I/F 305 is an interface for connecting a system bus 310 and the operating section 12. The operating section I/F 305 receives the image data to be displayed on the operating section 12 from the system bus 310 and supplies it to the operating section 12, and supplies the information input from the operating section 12 to the system bus 310.

A network I/F 306 is connected between the LAN 50 and the system bus 310 to perform input and output of information. A modem 307 is connected between the WAN 331 and the system bus 310 to perform input and output of information. A binary image rotating section 308 converts the direction of the image data before transmission. A binary image compression/decompression section 309 converts the resolution of the image data before transmission to a prescribed resolution or to a resolution matching the capacity of a party. The compression and decompression are carried out using a JBIG, MMR, MR or MH system. An image bus 330, which is a transmission line for exchanging the image data, includes a PCI bus or IEEE 1394.

A scanner image processing section 312 carries out correction, processing and editing of the image data received from the scanner section 13 via a scanner I/F 311. Besides, the scanner image processing section 312 makes a decision on whether the received image data is a color original document or a black-and-white original document, or a text original document or a photographic original document. Then, it attaches the decision result to the image data. Such collateral information is referred to as attribute data. Details of the processing the scanner image processing section 312 performs will be described later.

A compressing section 313 receives the image data, and divides the image data to blocks each consisting of 32 pixels× 32 pixels. Each 32×32 pixel image data is referred to as tile data.

Figure 4:
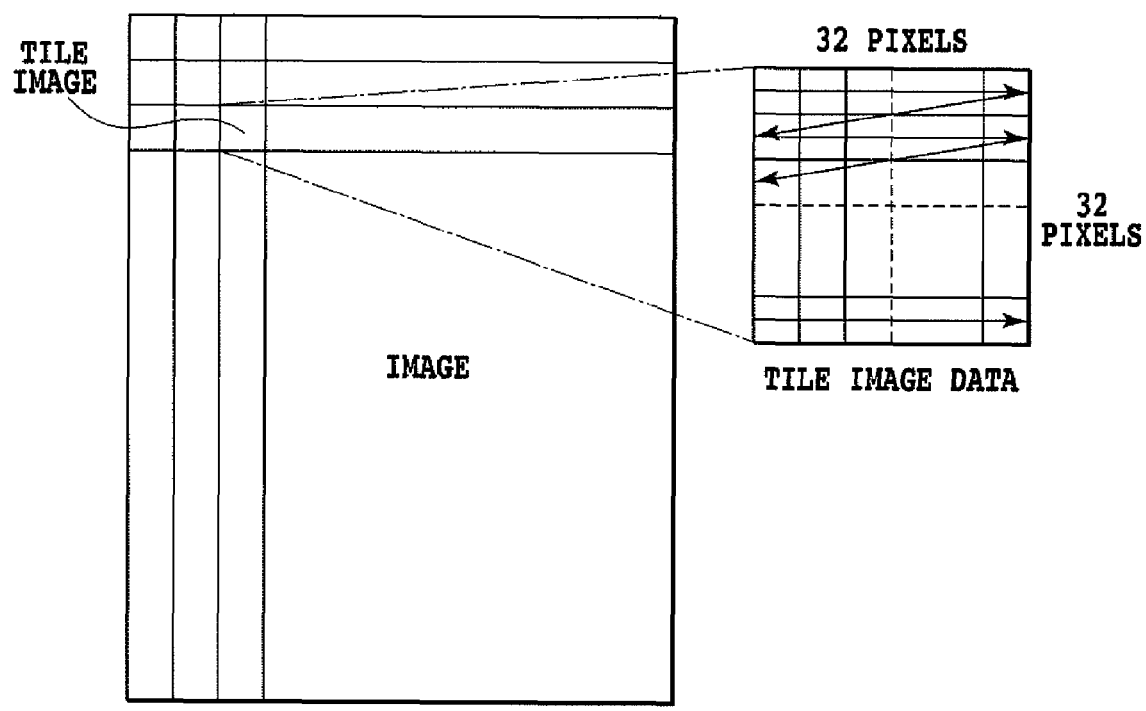
FIG. 4 is a schematic diagram illustrating tile data.

FIG. 4 schematically illustrates the tile data. On the original document (paper medium before reading), each region corresponding to the tile data is referred to as a tile image. To the tile data, average luminance information in the 32×32 pixel block and the coordinate position of the tile image on the original document are added as header information. In addition, the compressing section 313 compresses the image data consisting of a plurality of tile data. A decompressing section 316 decompresses the image data consisting of a plurality of tile data, and then develops into a raster, and delivers it to a printer image processing section 315.

The printer image processing section 315 receives the image data delivered from the decompressing section 316, and performs image processing on the image data with referring to the attribute data annexed to the image data. The image data passing through the image processing is supplied to the printer section 14 via a printer I/F 314. Details of the processing carried out by the printer image processing section 315 will be described later.

An image converting section 317 performs prescribed converting processing on the image data. The processing section comprises the following processing sections.

A decompressing section 318 decompresses the received image data. A compressing section 319 compresses the received image data. A rotating section 320 rotates the received image data. A scaling section 321 performs resolution converting processing (from 600 dpi to 200 dpi, for example) of the received image data. A color space converting section 322 converts the color space of the received image data. The color space converting section 322 can carry out known groundwork skipping processing using a matrix or table, known LOG converting processing (RGB→CMY) or known output color correcting processing (CMY→CMYK). A binary-multivalued converting section 323 converts received binary gradation image data to 256-step gradation image data. In contrast, a multivalued-binary converting section 324 converts received 256-step gradation image data to binary gradation image data by a technique such as error diffusion processing.

A synthesizing section 327 combines two received image data to generate a piece of image data. To combine two image data, such a method is applied that uses the average value of the luminance values of the corresponding pixels to be combined as a composite luminance value, or that uses the luminance value higher in the luminance level between the corresponding pixels as the luminance value of the composite pixels. In addition, a method of using darker pixels as the composite pixels is also possible. Furthermore, a method that determines the composite luminance value according to OR, AND or XOR operation between the pixels to be combined is also applicable. These combining methods are all well-known techniques. A thinning section 326 carries out resolution conversion by thinning out the pixels of the received image data, and generates image data with a resolution of ½, ¼, ⅛ and the like of the original resolution. A shifting section 325 gives a margin to the received image data or eliminates the margin.

An RIP 328 receives intermediate data generated from PDL code data transmitted from the PC 40 or the like, and generates (multivalued) bit map data. A compressing section 329 compresses the bit map data.

<Detailed Description of Scanner Image Processing Section 312 (FIG. 5)>

Figure 5:
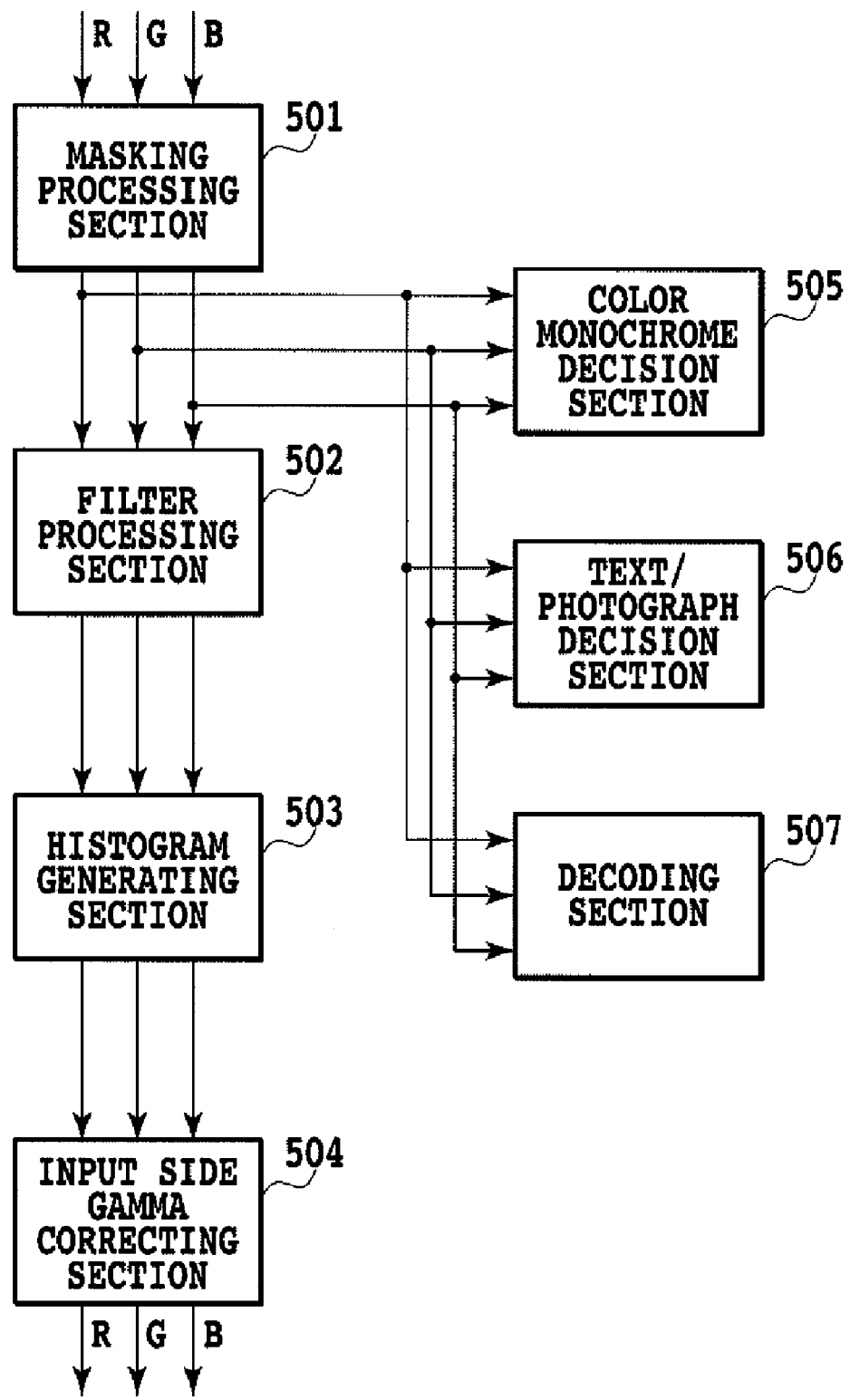
FIG. 5 is a block diagram showing a scanner image processing section.

FIG. 5 shows an internal structure of the scanner image processing section 312. The following is a detailed description about FIG. 5.

The scanner image processing section 312 receives the image data composed of RGB luminance signals each consisting of eight bits. The luminance signals are converted to standard luminance signals independent of the filter colors of a CCD by a masking processing section 501.

A filter processing section 502 arbitrarily corrects the spatial frequency of the received image data. This processing section performs arithmetic processing on the received image data using a 7×7 matrix, for example. Incidentally, in a copying machine or multifunction machine, it is possible to select a text mode, a photographic mode or a text/photographic mode as a copy mode by depressing a tab 704 shown in FIG. 7. When the user selects the text mode, the filter processing section 502 places a filter for text on the entire image data. When the user selects the photographic mode, it places a filter for photograph on all the image data. In addition, when the user selects the text/photographic mode, it adaptively switches a filter for each pixel in accordance with a text/photograph decision signal (part of the attribute data) which will be described later. Thus, a decision is made for each pixel on whether to place the filter for photograph or for text. As for the filter for photograph, such a coefficient that enables smoothing of only high frequency components is set to prevent image roughness. On the other hand, as for the filter for text, such a coefficient that enables considerable edge emphasis is set to sharpen the text.

A histogram generating section 503 samples the luminance data of the individual pixels constituting the received image data. More specifically, it samples the luminance data in a rectangular region enclosed from a start point to an end point designated in the main scanning direction and subscanning direction at a fixed pitch in the main scanning direction and subscanning direction. Then, it generates the histogram data from the sampled results. The generated histogram data can be used to estimate the groundwork level when carrying out the groundwork skipping processing. An input side gamma correcting section 504 converts to luminance data having nonlinear characteristics by using a table or the like.

A color monochrome decision section 505 decides on whether the individual pixels constituting the received image data are a chromatic color or an achromatic color, and annexes the decision results to the image data as a color monochrome decision signal (part of the attribute data).

A text/photograph decision section 506 makes a decision on whether each pixel constituting the image data is a pixel constituting text, a pixel constituting a halftone dot, a pixel constituting text in halftone dots, or a pixel constituting a solid image from the pixel value of each pixel and pixel values of its neighboring pixels. The pixels that cannot be classified to any one of them are pixels constituting a white region. Then, the decision results are annexed to the image data as a text/photograph decision signal (part of the attribute data).

A decoding section 507 detects, when the image data output from the data masking processing section 501 includes code image data, its existence. Then, it extracts information by decoding the code image data detected.

<Detailed Description of Printer Image Processing Section 315 (FIG. 6)>

Figure 6:
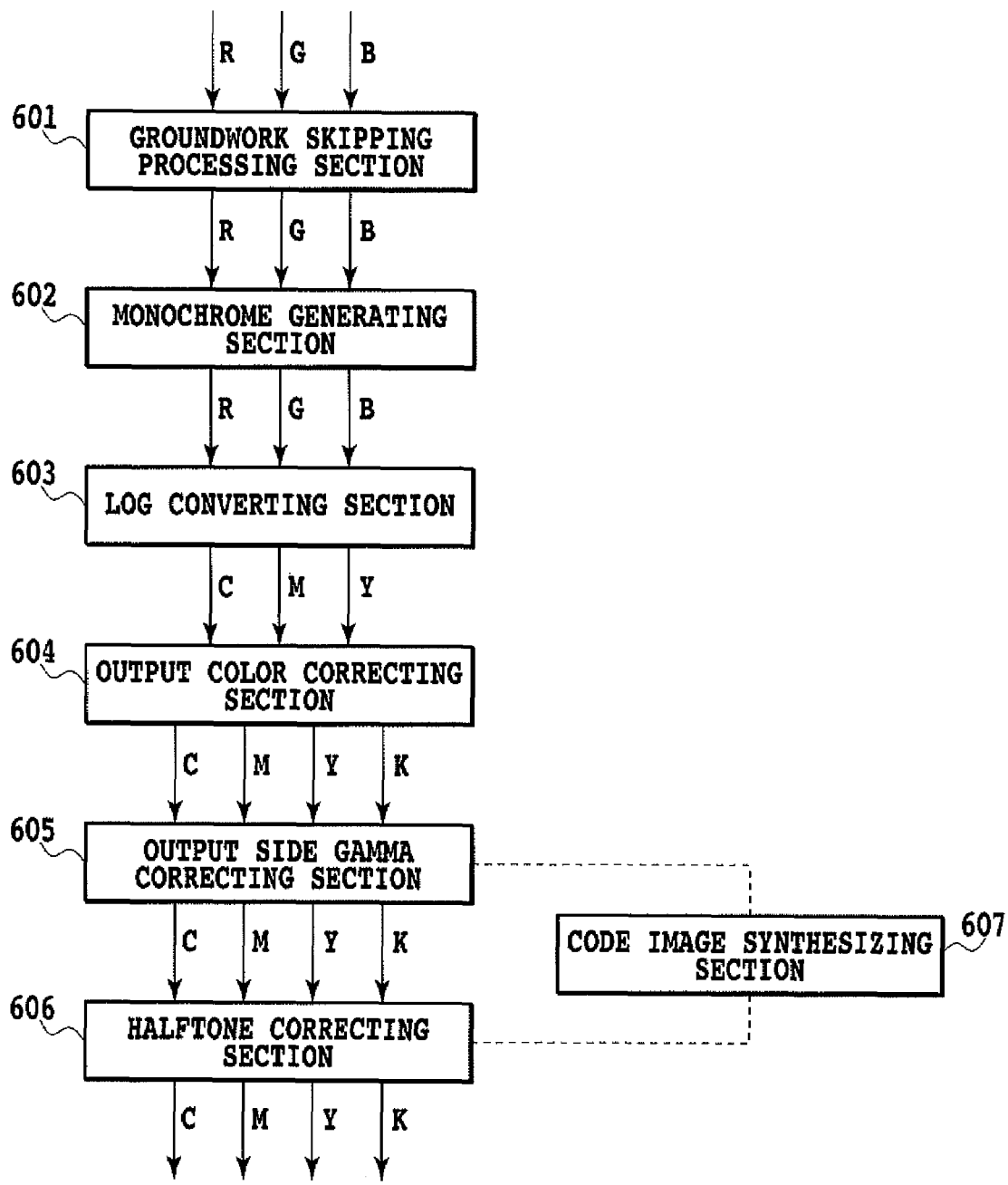
FIG. 6 is a block diagram showing a printer image processing section.

FIG. 6 is a block diagram showing a flow of the processing carried out in the printer image processing 315. The following is a detailed description about FIG. 6.

A groundwork skipping processing section 601 skips (removes) the groundwork color of the image data by using the histogram generated by the scanner image processing section 312. A monochrome generating section 602 converts the color data to the monochrome data. A Log converting section 603 carries out luminance level conversion. The Log converting section 603 converts the input RGB image data to CMY image data, for example. An output color correcting section 604 carries out output color correction. For example, it converts the input CMY image data to CMYK image data by using a table or matrix. An output side gamma correcting section 605 carries out correction in such a manner that the reflection level after the copy output is proportional to the signal value input to the output side gamma correcting section 605. A code image synthesizing section 607 combines the code image data generated by the <encoding processing> which will be described later with the (original document) image data. A halftone correcting section 606 performs halftone processing in accordance with the number of gray levels of the output printer section. For example, as for the received high gradient image data, it carries out digitization to two levels or 32 levels.

<Encoding Processing>

The CPU 301 can perform control in such a manner as to generate the code image data by carrying out encoding processing of the information read from a memory card slot not shown or of the image data read from the scanner section 13.

In the present specification, the code image refers to an image such as a two-dimensional code image and a bar code image, or to an electronic watermark image generated by electronic watermark technology.

Furthermore, the CPU 301 can perform control in such a manner as to transmit the generated code image data to a code image synthesizing section 607 in the printer image processing section 315 vi a data bus not shown.

The foregoing control (generating control of the code image and transmission control) is carried out by executing the programs stored in the RAM 302.

The above was the description of the controller 11.

<Description of Operating Screen>

Figure 7:
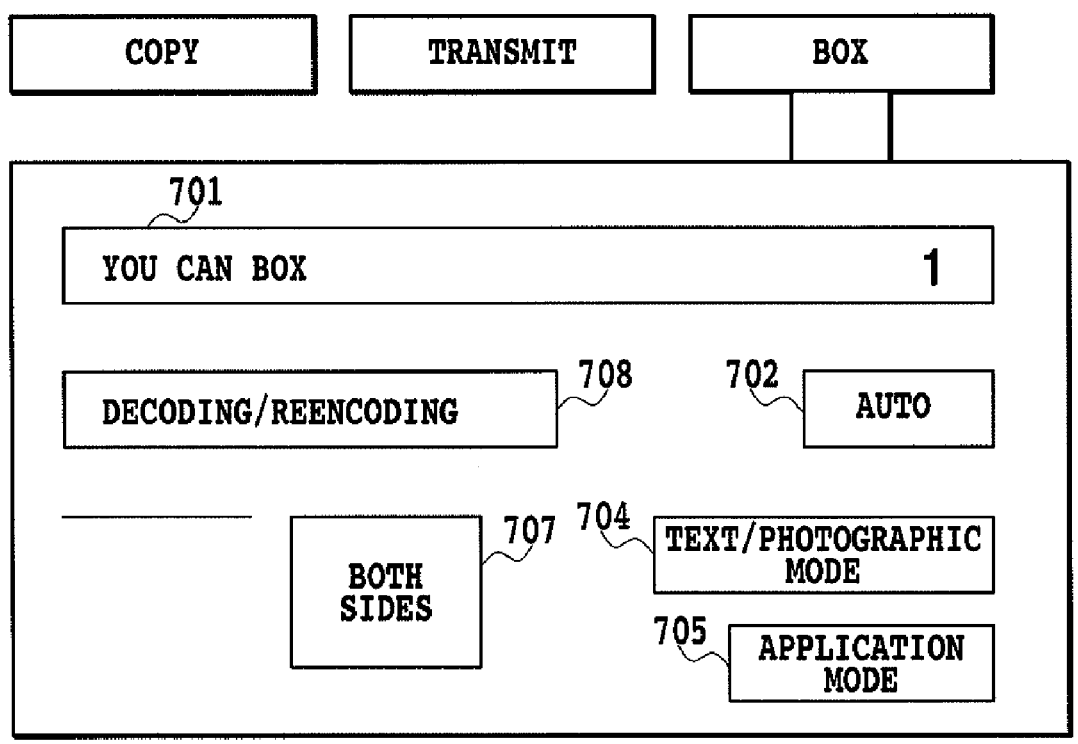
FIG. 7 is a diagram showing a copy screen of an operating section.

FIG. 7 shows an initial screen in the image forming apparatus 10. The following is a detailed description about FIG. 7.

A region 701 indicates whether the image forming apparatus 10 can accept copy or not, and a number of copies set. An original document selection tab 704 is a tab for selecting the type of the original document. Every time the tab is depressed, one of the three types of pop-up selecting menus of the text, photographic and text/photographic modes is displayed. A finishing tab 706 is a tab for carrying out settings associated with various types of finishing. A duplex setting tab 707 is a tab for carrying out settings associated with duplex reading and duplex printing. A reading mode tab 702 is a tab for selecting a reading mode of the original document. Every time the tab is depressed, one of the three types of pop-up selection menus of color/black/auto (ACS) is displayed. When the color is selected, color copy is performed, and when the black is selected, monochrome copy is carried out. In addition, when the ACS is selected, the copy mode is determined according to the monochrome color decision signal described above.

A tab 708 is a tab for selecting processing of decoding and reencoding the code image. The decoding/reencoding processing will be described later.

<Operation at Press of Decoding/Reencoding Processing Tab 708>

Figure 14:
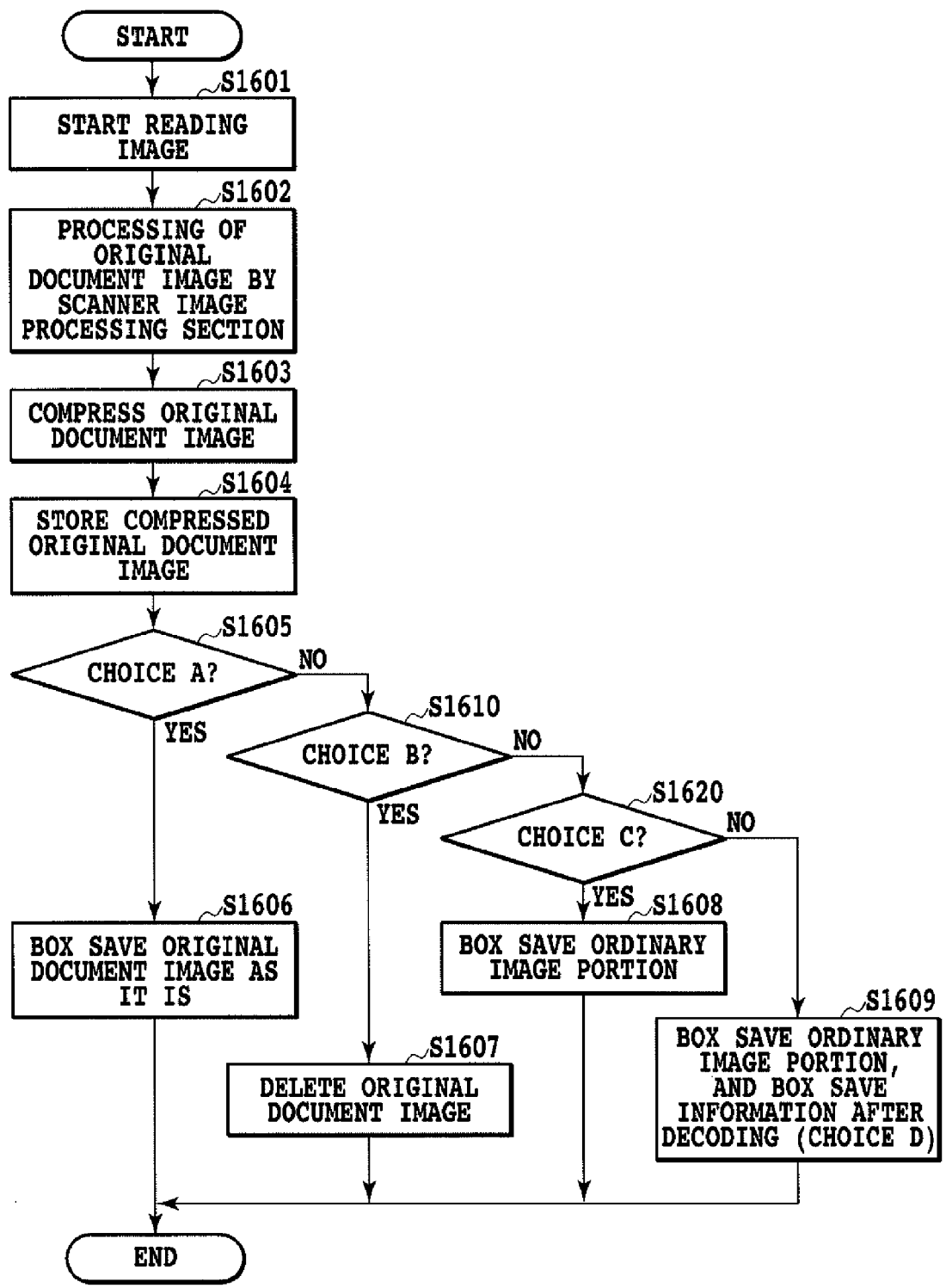
FIG. 14 is a flowchart illustrating decoding and reencoding processing.

FIG. 14 is a flowchart concerning the decoding/reencoding processing executed at the time when the user presses the decoding/reencoding processing tab 708 as shown in FIG. 7. Referring to FIGS. 8-10, FIG. 14 will be described in detail below.

Figure 8:
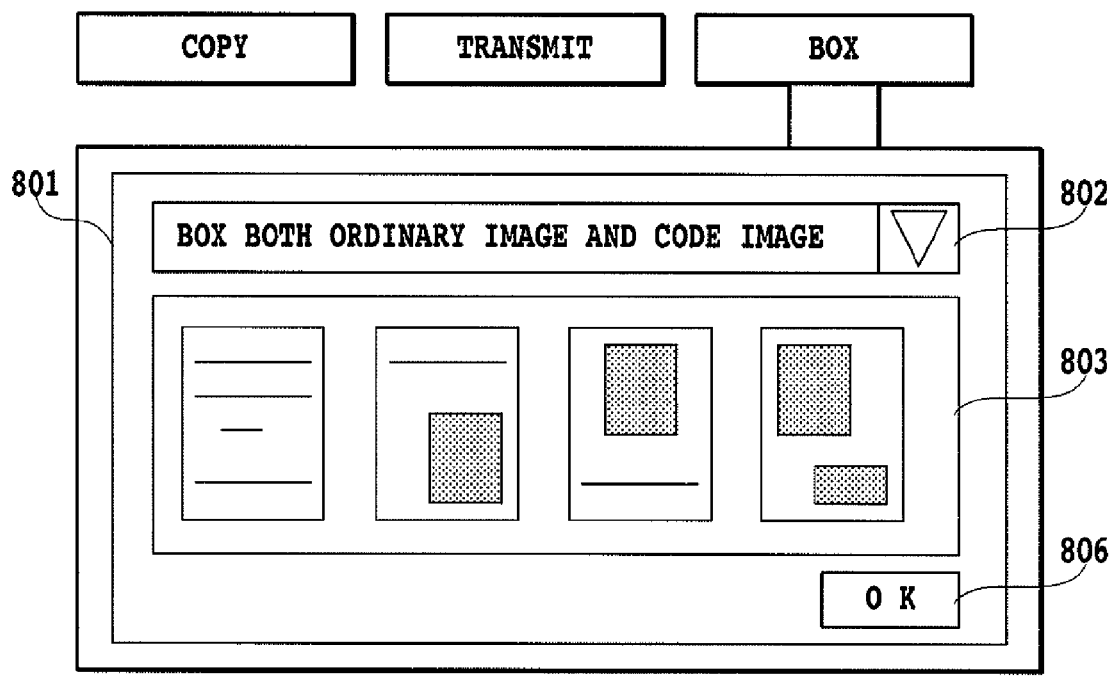
FIG. 8 is a diagram showing a subdialogue on the copy screen.

First, before step 1601, if the CPU 301 receives that the user presses the decoding/reencoding processing tab 708, the CPU 301 has the operating section 12 display the screen as shown in FIG. 8.

In FIG. 8, a subdialogue 801 is displayed on the screen as shown in FIG. 7. The CPU 301 uses the subdialogue 801 to receive the user instruction on how to handle the original document, the reading of which is started at step 1601. The subdialogue as shown in FIG. 8 will be described below.

As for an original document image processing method instructing section 802, the CPU 301 uses it to receive the user instruction on how to handle the code image contained in the original document image (or information after decoding obtained by decoding the code image) and an ordinary image other than the code image.

An original document image processing method instructing section 803 is used to show a prognostic diagram of a processing result or a schematic diagram of the processing result that is obtained when processing the original document image in accordance with the processing method of the original document image designated through the original document image processing method instructing section 802.

An original document image processing content approving section 806 is used for notifying the image forming apparatus that the user approves the processing content of the original document image.

Figure 9:
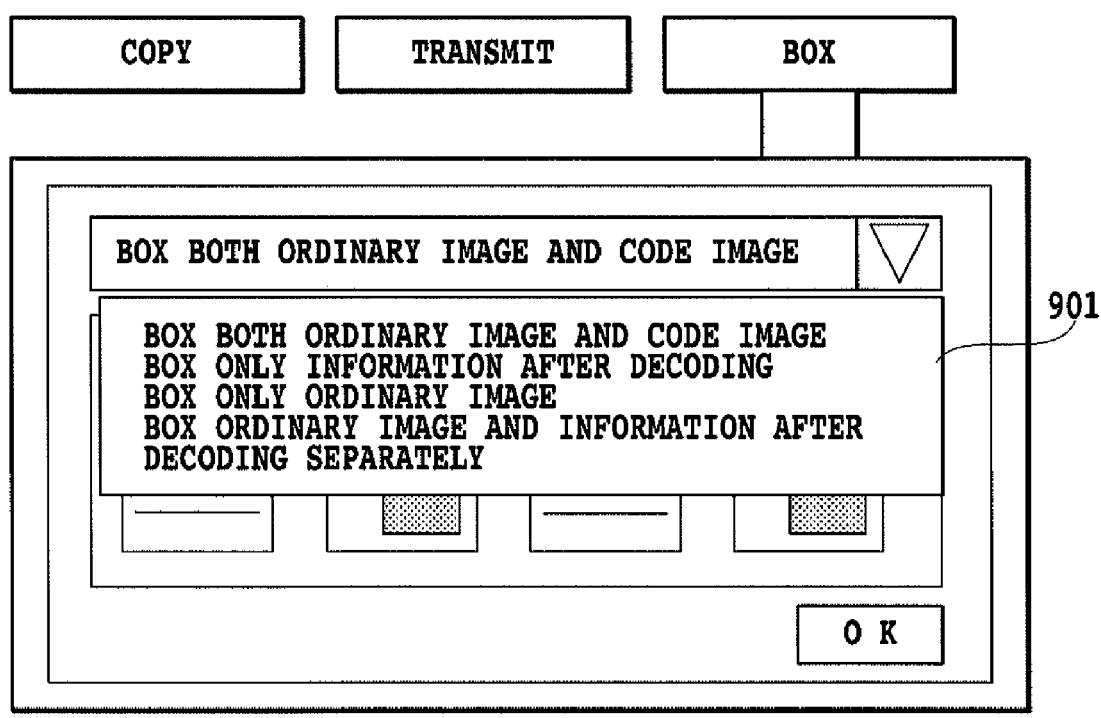
FIG. 9 is a diagram showing an original document image processing method selecting section.

FIG. 9 is a diagram showing an example of the screen displayed by the CPU 301 when the CPU 301 receives that the user presses the original document image processing method instructing section 802 on the screen as shown in FIG. 8. The following is a detailed description about FIG. 9.

When the CPU 301 receives that the user presses the original document image processing method instructing section 802, the CPU 301 displays possible choices of the processing method of the original document image, and displays an original document image processing method selecting section 901 for receiving an input from the user. In this example, four choices are displayed, each of which shows that it executes the following processing.

"Box Saving Both Ordinary Image And Code Image Without Change": Box saves the original document image as it is. Here, the original document image refers to both the ordinary image and code image.

"Box Saving Only Information After Decoding": Extracts only the code image from the original document image, and box saves the information obtained by decoding the code image.

"Box Saving Only Ordinary Image": Box saves only the ordinary image in the original document image.

"Box Saving Ordinary Image And Information After Decoding Dividedly (Separately)": Box saves the information obtained by decoding the code image in the original document image and the ordinary image in the original document image with establishing correspondence between them.

Figure 10:
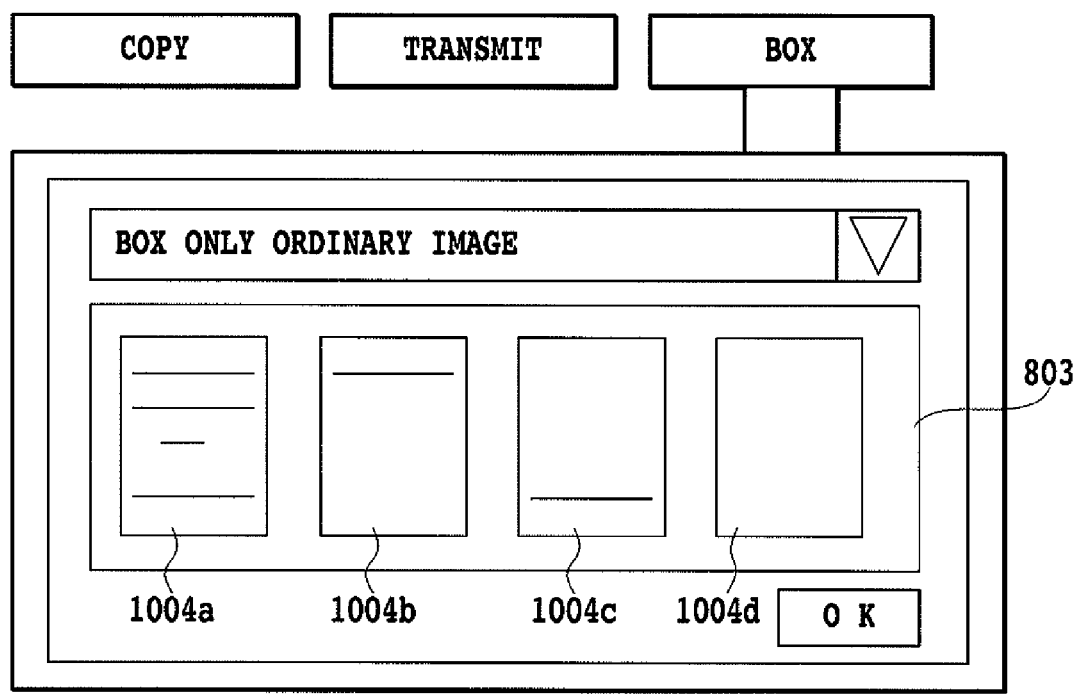
FIG. 10 is a diagram showing a display example of the subdialogue on the copy screen.

FIG. 10 is a diagram showing an example of the screen the CPU 301 displays when the CPU 301 receives from the original document image processing method selecting section 901 that the user selects the "box saving only ordinary image" on the screen as shown in FIG. 9. This screen example shows what kind of image (processing result) is obtained when "box saving only ordinary image" is selected. However, since the reading of the original document has not yet been started, only a schematic diagram of the processing result is shown rather than the processing result itself to be precise.

The following is a detailed description about FIG. 10.

In the original document image processing result display section 803 in the screen example as shown in FIG. 10, thumbnail images (consisting of only the ordinary images) 1004a, 1004b, 1004c and 1004d of the images obtained by removing the code images from the original document images are displayed. Thus, FIG. 10 shows a screen example resulting from the transition when the CPU 301 receives that the user selects "box saving only ordinary image" using FIG. 9. It goes without saying that when the CPU 301 receives that the user selects another original document image processing method using FIG. 9, the screen corresponding to the selection is displayed.

When the start button is pressed after completing the foregoing selection, the CPU 301 retains the selection the user instructs using the screens shown in FIG. 7-FIG. 9 in the RAM 302, and shifts the processing to step 1601.

At step 1601 shown in FIG. 14, the CPU 301 controls in such a manner as to deliver the original document data read by the scanner section 13 to the scanner image processing section 312 via the scanner I/F 311 as the image data.

At step 1602, the scanner image processing section 312 performs the processing as shown in FIG. 5 on the image data, and generates new image data and attribute data. In addition, it annexes the attribute data to the image data. Furthermore, the decoding section 507 in the scanner image processing section 312 detects, when the code image data is present, its position. Then, it decodes the detected code image data to obtain its information, and delivers the acquired information after decoding to the RAM 302 via a data bus not shown. Receiving the information, the RAM 302 stores the information after decoding. After completing the processing at step 1602, the processings at step 1608 and at step 1603 are started simultaneously.

At step 1603, the compressing section 313 divides the new image data generated by the scanner image processing section 312 to blocks each consisting of 32 pixels×32 pixels to generate the tile data. Furthermore, the compressing section 313 compresses the image data consisting of the plurality of tile data.

At step 1604, the CPU 301 controls in such a manner as to deliver the image data compressed by the compressing section 313 to the RAM 302 to be stored.

At step 1605, the CPU 301 makes a decision as to the selection (retained in the RAM 302), the input of which the CPU 301 receives from the user at step 1601.

Then, if the CPU 301 makes a decision that the choice A "box saving both ordinary image and code image without change" is selected at step 1605, the CPU 301 shifts the processing to step 1606. Thus, at this step 1606, the CPU 301 box saves the original document image as it is. More specifically, the CPU 301 controls in such a manner as to store the original document image which has been compressed and stored in the RAM 302 to the HDD 304. Furthermore, the CPU 301 deletes the information after decoding which is stored in the RAM 302 without storing this information in the HDD 304.

At step 1605, unless the CPU 301 makes a decision that the choice A is selected, the CPU 301 shifts the processing to step 1610.

At step 1610, if the CPU 301 makes a decision that the choice B "box saving only information after decoding" is selected, the CPU 301 shifts the processing to step 1607. At this step 1607, the CPU 301 deletes the original document image. More specifically, the CPU 301 deletes the original document image compressed by the RAM 302 and stored in the RAM 302 without storing the original document image in the HDD 304. On the other hand, the CPU 301 stores in the HDD 304 the information after decoding stored in the RAM 302.

In addition, if the CPU 301 makes a decision that the choice C "box saving only ordinary image" is selected, the CPU 301 shifts the processing to step 1608. At this step 1608, the CPU 301 box saves the ordinary image portion of the original document image. The concrete processing is as follows.

At step 1610, unless the CPU 301 makes a decision that the choice B is selected, the CPU 301 shifts the processing to step 1620.

First, at step 1620, the CPU 301 controls in such a manner as to delete the information after decoding stored in the RAM 302 without storing it in the HDD 304. After that, the CPU 301 temporarily decompresses the original document image compressed by the RAM 302 and stored in the RAM 302. Subsequently, the CPU 301 acquires the position of the code image detected by the decoding section 507, and paints white the portion of the code image in the original document image after the decompression. Thus, only the ordinary image is obtained from the original document image. Finally, the CPU 301 controls in such a manner as to compress the ordinary image again and to store it in the RAM 302, and then to save the ordinary image stored in the RAM 302 in the HDD 304.

At step 1620, unless the CPU 301 makes a decision that the choice C is selected, the CPU 301 shifts the processing to step 1609.

At step 1609, the CPU 301 selects the choice D "box saving ordinary image and information after decoding dividedly". At step 1609, the CPU 301 not only box saves the ordinary image portion of the original document image, but also box saves the information after decoding obtained from the code image in the original document image. The concrete processing is as follows.

First, the CPU 301 controls in such a manner as to store the information after decoding stored in the RAM 302 in the HDD 304. After that, the CPU 301 temporarily decompresses the original document image compressed by the RAM 302 and stored in the RAM 302. Subsequently, the CPU 301 acquires the position of the code image detected by the decoding section 507, and paints white the portion of the code image in the original document image after the decompression. Thus, only the ordinary image is obtained from the original document image. Finally, the CPU 301 controls in such a manner as to compress the ordinary image again and to store it in the RAM 302, and then to save the ordinary image stored in the RAM 302 in the HDD 304.

Embodiment 2

In the embodiment 1, before starting scanning, the CPU 301 receives the selection of the user who selects one of the four choices. In contrast with this, in the embodiment 2, after starting scanning, the CPU 301 receives the selection of the user who selects one of the four choices.

The image forming apparatus 10 or 20 receives, at the start of its use by the user, the input of the user ID and password via the operating section 12 or 22, or the log-in operation using an IC card or the like. The user authentication means of the image forming apparatus 10 or 20 identifies the user. In addition, the CPU 301 stores the user ID that is input and approved in the log-in operation process in the RAM 302. Furthermore, as will be described in detail below, the CPU 301 receives the contents of the user authority, and displays the display screen in accordance with the contents of the user authority.

Figure 18:
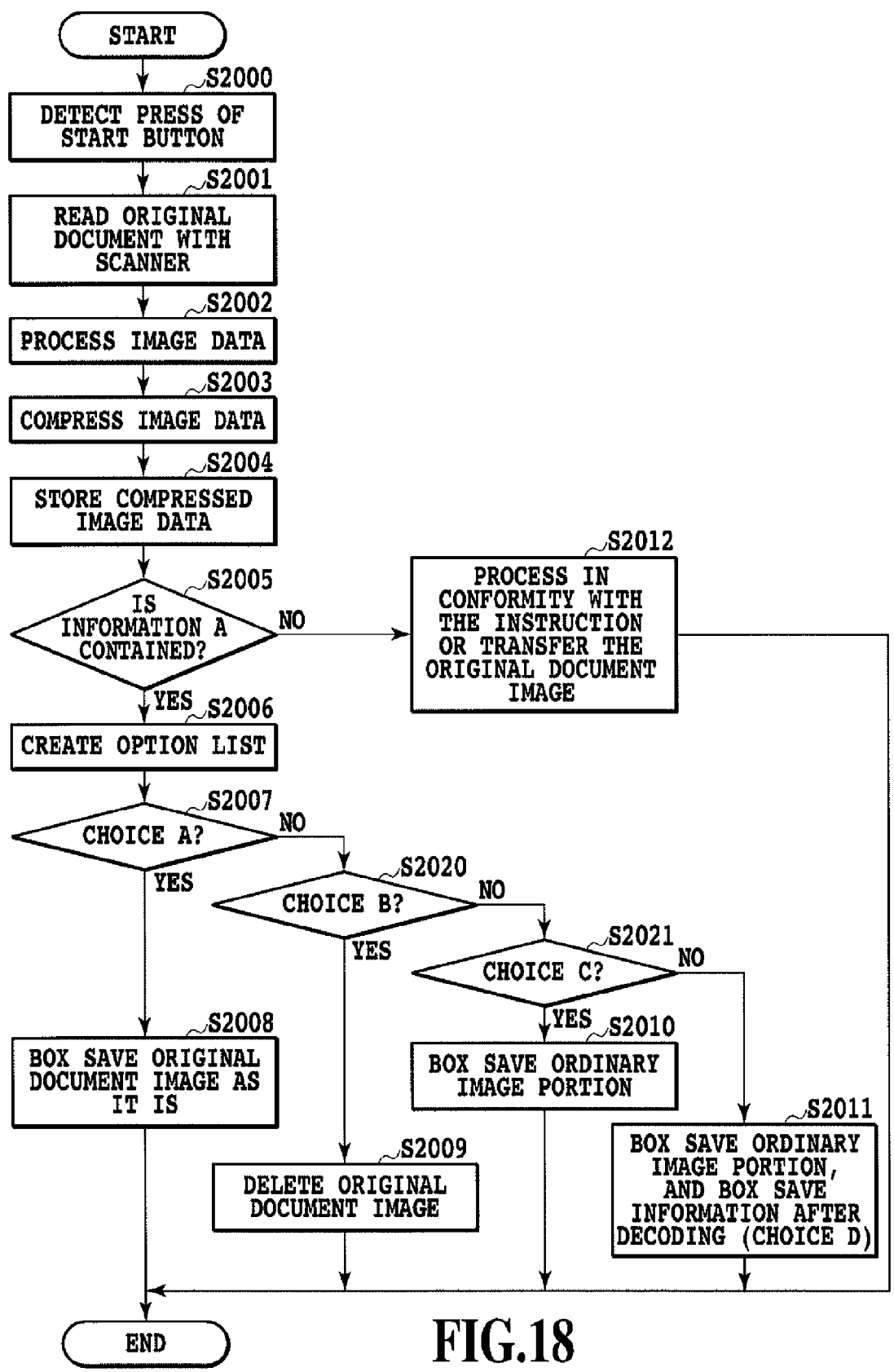
FIG. 18 is a flowchart illustrating control operation of the image processing apparatus in accordance with the present invention.

FIG. 18 is a flowchart illustrating the processing in the embodiment 2. Referring to FIG. 18, the embodiment 2 will be described in detail below.

At step 2000, the CPU 301 controls in such a manner as to shift the processing to step 2001 if the CPU 301 detects a press of the start button after the box is selected.

At step 2001, the CPU 301 controls in such a manner as to deliver the original document read by the scanner section 13 to the scanner image processing section 312 via the scanner I/F 311 as the image data.

At step 2002, the scanner image processing section 312 performs the processing as shown in FIG. 5 on the image data to generate the new image data and the attribute data. In addition, it annexes the attribute data to the image data. Furthermore, the decoding section 507 in the scanner image processing section 312 detects, when the code image data is present, its position. Then, it decodes the code image data detected by the scanner image processing section 312 to obtain the information. The CPU 301 delivers the information after decoding obtained to the RAM 302 using the data bus not shown to be stored.

Subsequently, at step 2003, the compressing section 313 divides the new image data generated by the scanner image processing section 312 to blocks each consisting of 32 pixels× 32 pixels to generate the tile data. Furthermore, the compressing section 313 compresses the image data consisting of the plurality of tile data.

At step 2004, the CPU 301 controls in such a manner as to deliver the image data compressed by the compressing section 313 to the RAM 302 to be stored.

At step 2005, the CPU 301 accesses the information after decoding which is stored in the RAM 302 at step 2002, and makes a decision as to whether the information after decoding includes information A "information specifying the user who can access the information after decoding". If the CPU 301 makes a decision that the information after decoding includes the information A, the CPU 301 shifts the processing to step 2006. In contrast, unless the CPU 301 makes a decision that the information after decoding includes the information A, the CPU 301 shifts the processing to step 2012.

At step 2006, according to whether the "information specifying the user who can access the information after decoding" includes the log-in user or not, the CPU 301 prepares a selectable option list about the processing method of the original document image. More specifically, the following processing is carried out.

First, according to the decision result at step 2006, the CPU 301 makes a decision as to whether the current log-in user is a "user authorized to access the information after decoding".

Then, if the CPU 301 makes a decision that the log-in user is "user authorized to access the information after decoding", the CPU 301 prepares the option list in such a manner that it contains an item about the information after decoding.

In the present specification, the term "item about information after decoding" refers to an indication item at least for the storage of the "information after decoding" such as "boxing only ordinary image" and "box saving ordinary image and information after decoding dividedly (separately)" of FIG. 9.

On the other hand, unless the CPU 301 makes a decision that the log-in user is a "user authorized to access the information after decoding", the CPU 301 prepares the option list in such a manner as not to include the item about the information after decoding. The CPU 301 controls in such a manner as to store the option list thus prepared in the RAM 302, and to display it on the operating section 12 thereafter.

Figure 11:
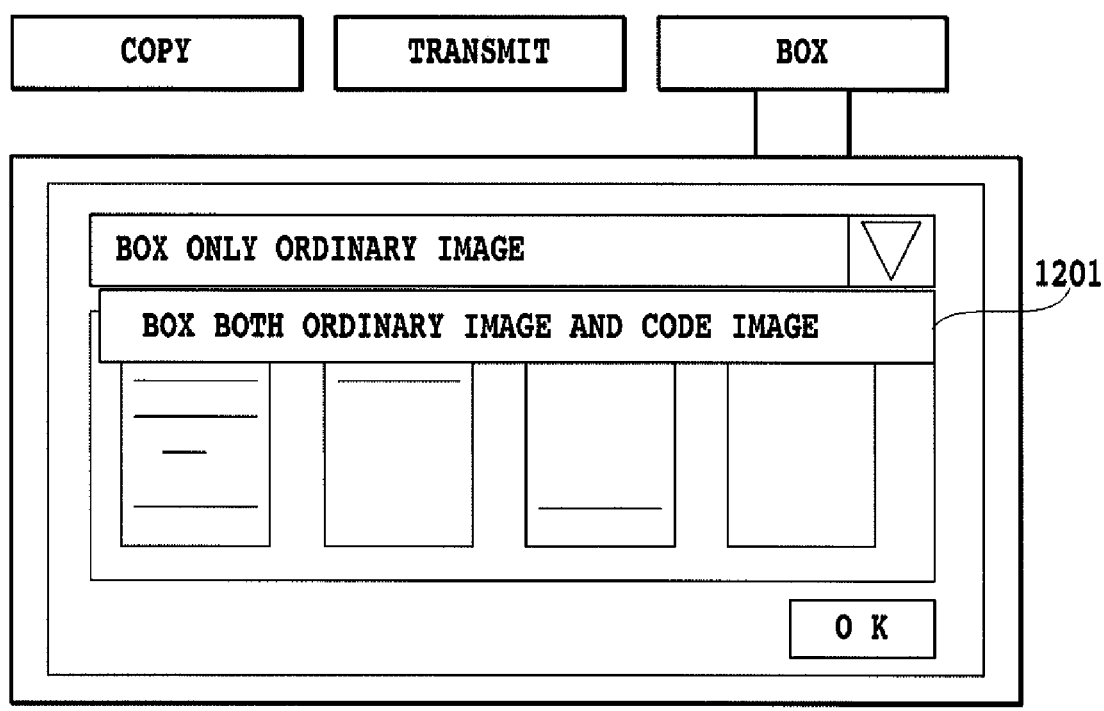
FIG. 11 is a diagram showing a display example of the subdialogue on the copy screen in the case of having no access right.

FIG. 11 is a diagram showing an example of the screen displayed on the operating section 12. The following is a detailed description about FIG. 11.

The CPU 301 displays the screen when the log-in user (user operating the image forming apparatus) does not have the access right to the information after decoding.

Since the user does not have the access right to the information in the screen shown in FIG. 11, the original document image processing method selecting section 1201 does not include the choice of the information after decoding. Accordingly, the screen shown in FIG. 11 displays only the choices "box only ordinary image" and "box both ordinary image and code image".

If the user selects one of the items in the option list on the operating section 12, the CPU 301 shifts the processing to step 2007.

At step 2007, the CPU 301 makes a decision as to the selection, the input of which the CPU 301 receives from the user.

Then, if the CPU 301 makes a decision that the choice A "box saving both ordinary image and code image without change" is selected at step 2007, the CPU 301 shifts the processing to step 2008. Thus, at this step 2008, the CPU 301 box saves the original document image as it is. More specifically, the CPU 301 controls in such a manner as to store the original document image which has been compressed and stored in the RAM 302 to the HDD 304. Furthermore, the CPU 301 deletes the information after decoding which is stored in the RAM 302 without storing the information in the HDD 304.

At step 2007, unless the CPU 301 makes a decision that the choice A is selected, the CPU 301 shifts the processing to step 2020.

At step 2020, if the CPU 301 makes a decision that the choice B "box saving only information after decoding" is selected, the CPU 301 shifts the processing to step 2009. At this step 2009, the CPU 301 deletes the original document image. More specifically, the CPU 301 deletes the original document image compressed by the RAM 302 and stored in the RAM 302 without storing the original document image in the HDD 304. On the other hand, the CPU 301 stores in the HDD 304 the information after decoding stored in the RAM 302.

At step 2020, unless the CPU 301 makes a decision that the choice B is selected, the CPU 301 shifts the processing to step 2021.

At step 2021, if the CPU 301 makes a decision that the choice C "box saving only ordinary image" is selected, the CPU 301 shifts the processing to step 2010. At this step 2010, the CPU 301 box saves the ordinary image portion of the original document image. The concrete processing is as follows.

First, the CPU 301 controls in such a manner as to delete the information after decoding stored in the RAM 302 without storing it in the HDD 304. After that, the CPU 301 temporarily decompresses the original document image compressed by the RAM 302 and stored in the RAM 302. Subsequently, the CPU 301 acquires the position of the code image detected by the decoding section 507, and paints white the portion of the code image in the original document image after the decompression. Thus, only the ordinary image is obtained from the original document image. Finally, the CPU 301 controls in such a manner as to compress the ordinary image again and to store it in the RAM 302, and then to save the ordinary image stored in the RAM 302 in the HDD 304.

At step 2021, unless the CPU 301 makes a decision that the choice C is selected, the CPU 301 shifts the processing to step 2011.

At step 2011, the CPU 301 selects the choice D "box saving ordinary image and information after decoding dividedly". At step 2011, the CPU 301 not only box saves the ordinary image portion of the original document image, but also box saves the information after decoding obtained from the code image in the original document image. The concrete processing is as follows.

First, the CPU 301 controls in such a manner as to store the information after decoding stored in the RAM 302 in the HDD 304. After that, the CPU 301 temporarily decompresses the original document image compressed by the RAM 302 and stored in the RAM 302. Subsequently, the CPU 301 acquires the position of the code image detected by the decoding section 507, and paints white the portion of the code image in the original document image after the decompression. Thus, only the ordinary image is obtained from the original document image. Finally, the CPU 301 controls in such a manner as to compress the ordinary image again and to store it in the RAM 302, and then to save the ordinary image stored in the RAM 302 in the HDD 304.

At step 2012, the CPU 301 executes, if the information after decoding contains any instruction, the processing in conformity with the instruction. Unless it contains any instruction, the CPU 301 controls in such a manner as to transfer the original document image (ordinary image and code image) from the RAM 302 to the HDD 304.

As described above, the foregoing embodiments have only four choices. The number of choices in the present invention, however, is not limited to four, but can be five, six or more.

For example, such a choice is allowed that divides the original document image (ordinary image and code image) and the information after decoding.

The term "to divide" in the present embodiment refers to separating the files and establishing associations between the files.

In the case where the another choice that divides the original document image and the information after decoding is added to the present embodiment, the operation becomes as follows. At step 2011 in the flowchart as shown in FIG. 18, unless the CPU 301 selects the choice D, the CPU 301 selects the additional choice.

In addition, the code image contained in the original document image has the access right information about the access right to the information that has been the source of the code image (that is, the information after decoding) as metadata.

Embodiment 3

Although the description so far is made as to the embodiments that complete the decoding operation of the information within the image forming apparatus, a method is also conceivable which carries out the processing in conjunction with an external apparatus or server. In particular, it is effective to make an inquiry at an external policy server about the confirmation of the access right to the information, or to make request to an external server for the processing unless the image forming apparatus itself can perform decoding or make images from the information.

Figure 12:
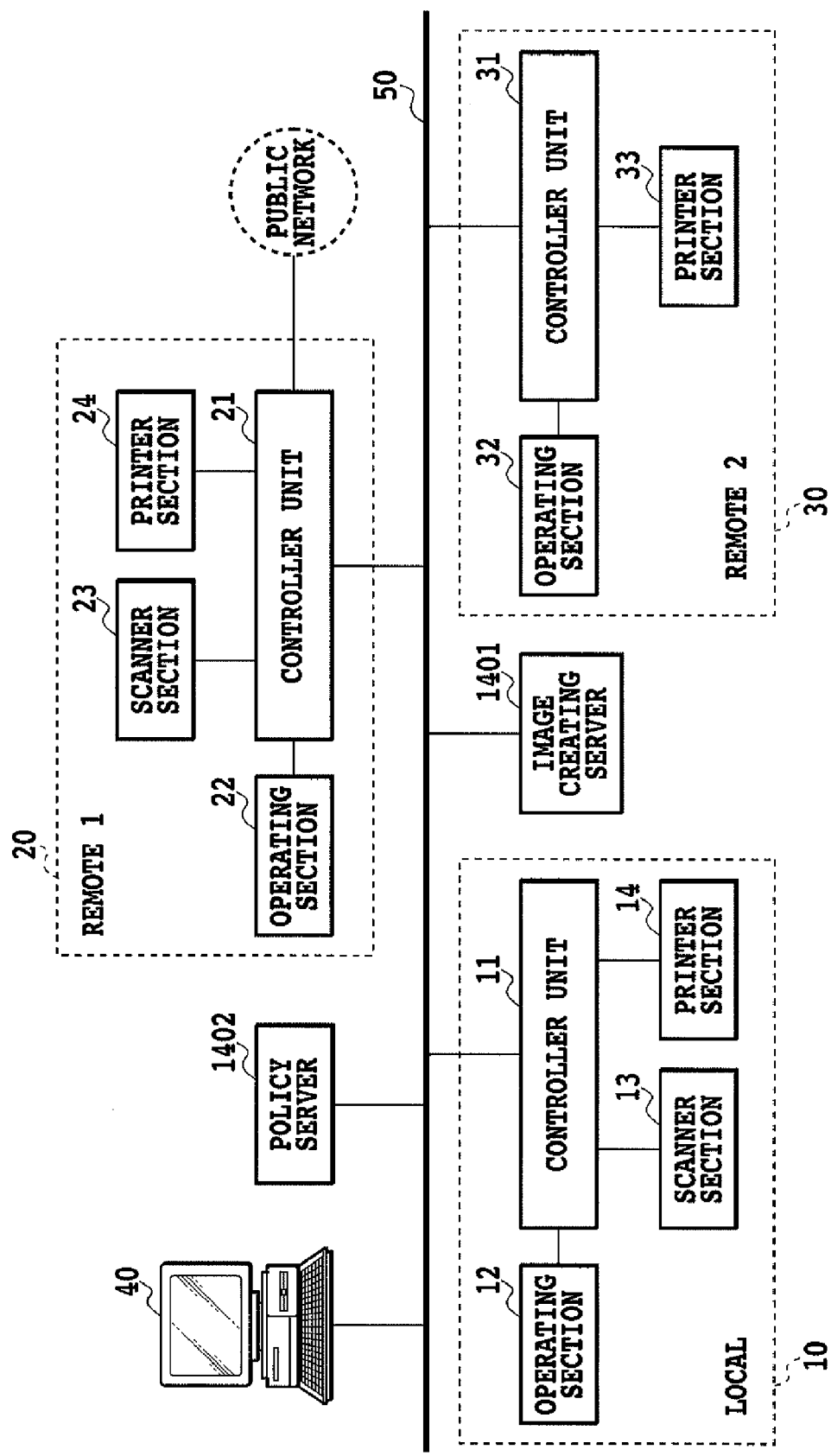
FIG. 12 is a diagram showing another embodiment of the image forming apparatus in accordance with the present invention.

FIG. 12 is a diagram showing the image forming apparatus when it executes the processing in conjunction with the external apparatus or server. The following is a detailed description about FIG. 12.

Compared with FIG. 1, FIG. 12 has an image creating server 1401 and a policy server 1402 added thereto.

The image creating server 1401 is a server that receives information, and draws an output image visually confirmable by a person (for example, if the received information is data of a spreadsheet program, the output image is a table image: generally, the processing is referred to as rendering). The image drawing server is used for rendering instead of the image forming apparatus without the capacity of rendering the information after decoding the code image.

The policy server 1402 is a server for managing the access right to each document within the image processing system, which document belongs to each user recorded in the image processing system. As for implementation methods of the policy server, there are various methods. In addition, the policy server 1402 in the present embodiment receives a document ID for uniquely identifying the document and a user ID via a network, and makes a decision as to whether the "user identified by the user ID" can access the "document identified by the document ID". Then, it sends back the decision result via the network again.

Figure 13:
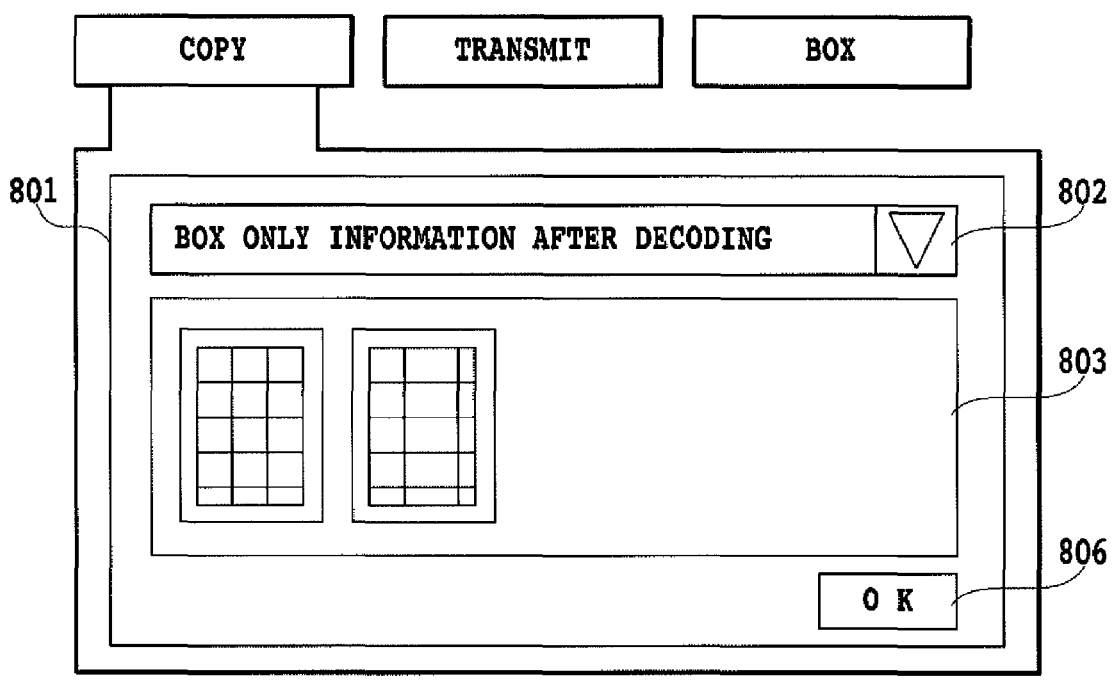
FIG. 13 is a diagram showing a display example of the subdialogue using an external rendering.

FIG. 13 is a diagram showing an example of the screen when the CPU 301 receives from the user the selection of the choice "box only information after decoding" by the user. The following is a detailed description about FIG. 13.

The term "box information after decoding" refers to storing the information obtained by decoding the code image contained in the original document in the HDD 304. For example, when the information after decoding is the data of the spreadsheet program, a printout is a table just as in the case where the spreadsheet program prints the information after decoding.

Generally, the image forming apparatus cannot convert (render) all the information of any format to a print image. Here, assume that the information after decoding is the data of the spreadsheet program, and that the image forming apparatus cannot convert the data to the print image (that the spreadsheet program is not installed in a multifunction machine).

In such a case, the CPU 301 transmits the information to the image creating server 1401 which carries out imaging (rendering) operation and creates thumbnail images, and displays the results on the original document image processing result display section 803.

Figure 15:
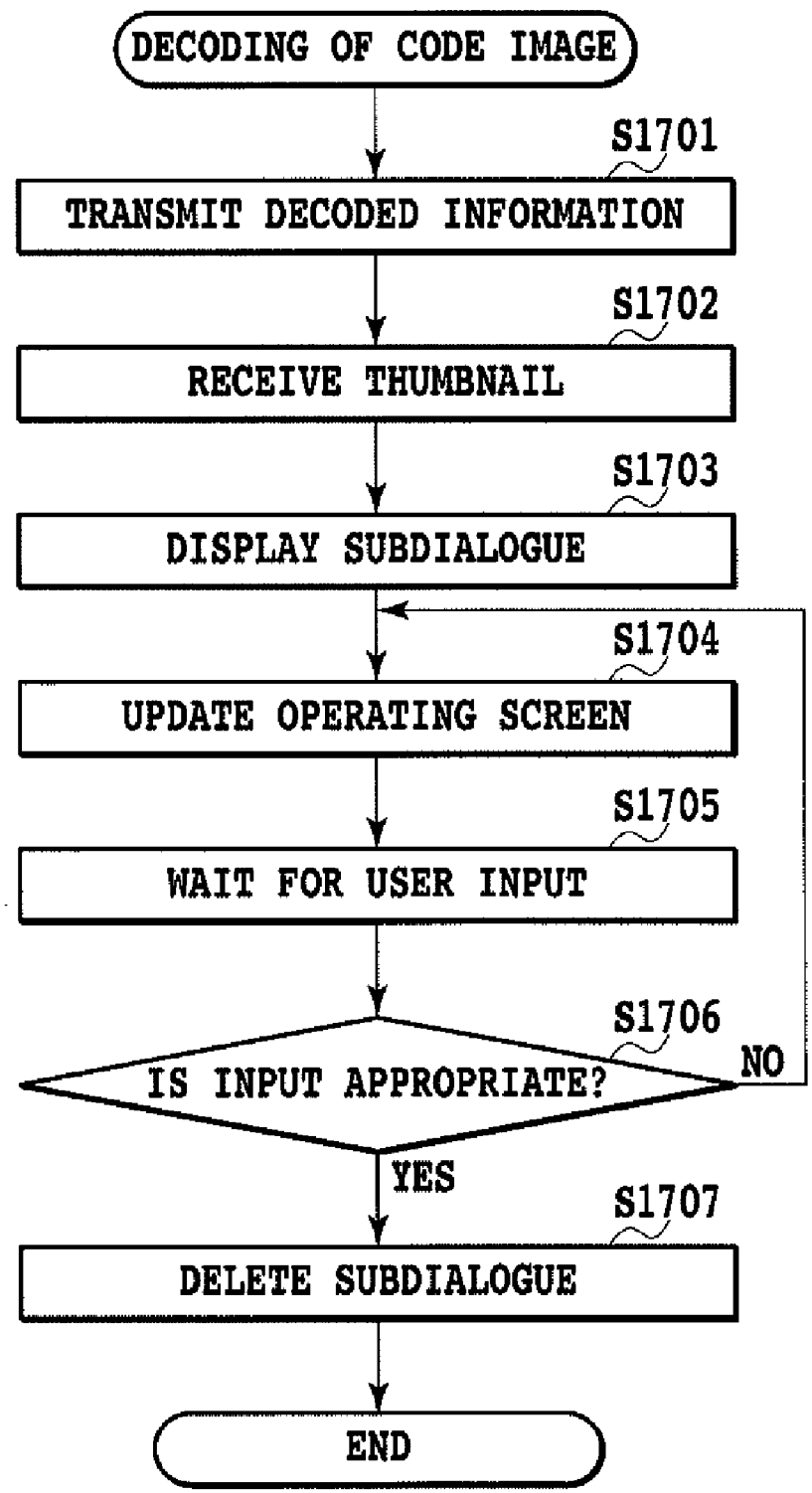
FIG. 15 is a flowchart illustrating another embodiment of the display control processing of the subdialogue.

The embodiment 3 executes the processing as shown in FIG. 15 instead of the processing at step 2006 of FIG. 18 of the embodiment 2. The processing shown in FIG. 15 will be described in detail below.

At step 1701, the CPU 301 extracts the information which is decoded at step 1602 and stored in the RAM 302, and transmits the information to the image creating server 1401 with controlling the network I/F 306. The image creating server 1401 renders the information received, creates thumbnail images from the result, and sends them back to the image forming apparatus.

At the next step 1702, controlling the network I/F 306, the CPU 301 receives the thumbnail images sent back from the image creating server 1401, and stores them in the RAM 302. As for the thumbnails stored in the RAM 302, the CPU 301 refers to them when the CPU 301 displays the thumbnail images on the original document image processing result display section 803 with controlling the operating section I/F 305 at step 1102.

At the next step 1703, the CPU 301 creates the window frame data of the subdialogue 801 on the RAM 302, and displays the data on the screen of the subdialogue 801 of the operating section 12 with controlling the operating section I/F 305. Here, the CPU 301 controls in such a manner as to select the first item in the option list as the initial value of the choices of the original document image processing method instructing section 802.

At the next step 1704, the CPU 301 updates the display on the original document image processing result display section 803.

At the next step 1705, the CPU 301 waits for an input of the user.

At the next step 1706, the CPU 301 makes a decision as to whether the operation the user inputs at step 1703 is a press of the original document image processing content approving section 806 or not. If it is a press of the original document image processing content approving section 806, the CPU 301 records it in the RAM 302, and shifts the processing to step 1707.

At step 1707, controlling the operating section I/F 305, the CPU 301 deletes the subdialogue 801.

On the other hand, unless the CPU 301 makes a decision at step 1706 that the operation the user inputs at step 1703 is an appropriate one of pressing the original document image processing content approving section 806, the user input is a change of the original document processing method by a press of the original document image processing method instructing section 802. Accordingly, the CPU 301 returns the processing to step 1704, and updates the display of the original document image processing result display section 803.

Furthermore, as to whether the user operating the image forming apparatus has the access right to the information obtained by decoding the code image or not, it is possible to make an inquiry at the policy server 1402 outside the image forming apparatus.

Figure 16:
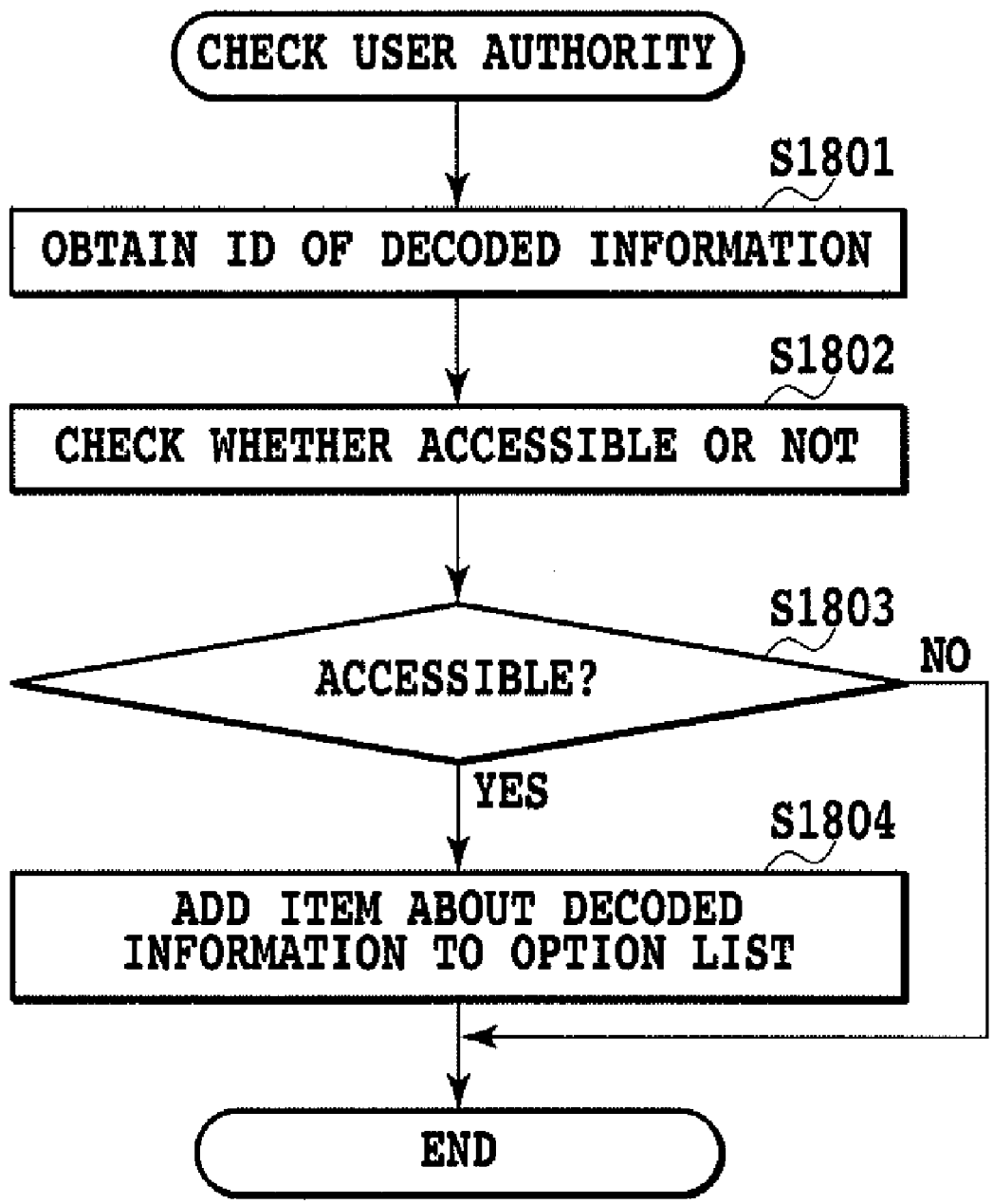
FIG. 16 is a flowchart illustrating processing of checking the access right using an external policy server.

The embodiment 3 executes the processing as shown in FIG. 16 in place of the processing at step 2005 of FIG. 18 of the embodiment 2. The following is a detailed description about FIG. 16.

Incidentally, it is assumed in the present embodiment that the information after decoding includes, instead of the "information specifying the user who can access the information after decoding", the information for uniquely identifying the information after decoding (such as the file name of the information after decoding).

Thus, even at the step previous to step 2006 that will be described below, processing slightly different from that of the embodiment 2 is executed.

More specifically, although the CPU 301 makes a decision in the embodiment 2 as to whether the information A is contained or not, the CPU 301 makes a decision in the embodiment 3 as to whether the information for uniquely identifying the information after decoding (such as the file name of the information after decoding) is contained or not. As a result of the decision, if it is contained, the CPU 301 shifts the processing to step 2006, and unless it is contained, shifts the processing to step 2012.

At step 1801 in FIG. 16, the CPU 301 accesses the information after decoding which is stored in the RAM 302 at step 2002, and obtains the information for uniquely identifying the information after decoding (such as the file name of the information after decoding). In the present specification, the information for uniquely identifying particular information is referred to as an information ID.

At the next step 1802, the CPU 301 obtains the user ID (log-in user ID) stored in the RAM 302 at the time when the user starts using the image forming apparatus. Then, the CPU 301 transmits it to the policy server 1402 together with the ID of the information after decoding the CPU 301 obtains at the preceding step 1801. The policy server 1402 receives the document ID and the user ID, makes a decision as to whether the user identified by the user ID can access the document identified by the document ID in accordance with a table within the policy server 1402, and sends back the decision result. The CPU 301 receives the reply from the policy server 1402 with controlling the network I/F 306.

At the next step 1803, the CPU 301 makes a decision as to whether the result received at the foregoing step 1802 is accessible or not. If accessible, the CPU 301 advances the processing to step 1804.

At step 1804, the CPU 301 places the item about the information after decoding in the selectable option list about the processing method of the original document image, and stores the option list in the RAM 302. The option list stored in the RAM 302 is referred to at step 1303 as the option list of the original document image processing method instructing section 802.

On the other hand, if the decision result at step 1803 indicates that the user cannot access the information after decoding, the CPU 301 skips the processing at step 1804, and completes the processing.

In the foregoing embodiments, the box saved information can be transmitted and output via a network or fax. In addition, a subject to be box saved can undergo ordinary duplication as well as box saving. In this case, the duplication can be performed regardless of the presence or absence of the information after decoding to be duplicated.

Other Embodiments

Although the foregoing embodiments are described by way of example that stores various pieces of information and images in the HDD within the image forming apparatus, it goes without saying that they can be output to a storage device separated from the image forming apparatus, and be stored in the storage device.

Although the foregoing embodiments are described by way of example that stores various pieces of information and images in the HDD within the image forming apparatus, it goes without saying that they can be output (that is, printed) on a sheet rather than stored.

The object of the present invention can be achieved by causing the image processing apparatus or the computer (or CPU or MPU) of the image processing apparatus to read a program for implementing the procedures of the flowcharts described in the embodiments from a storage medium storing the program. In this case, the program code itself read from the storage medium implements the functions of the foregoing embodiments. Thus, the program code and the storage medium that stores the program code fall within the scope of the present invention.

As the storage medium for supplying the program code, it is possible to use a floppy (registered trademark) disk, hard disk, optical disk, magneto-optical disk, CD-ROM, CD-R, magnetic tape, involatile memory card, and ROM.

The functions of the foregoing embodiments can be implemented by executing the program code the computer reads. In addition, the functions of the foregoing embodiments can be implemented by the processing carried out by causing the OS (operating system), which operates on the computer in accordance with the instructions of the program code, to execute part or all of the actual processing.

Furthermore, the program code read from the storage medium can be written in a memory provided in a function expansion board inserted into the computer or in a function expansion unit connected to the computer. After that, on a basis of the instructions of the program code, the CPU provided in the function expansion board or function expansion unit can execute part or all of the actual processing, thereby being able to implement the function of the foregoing embodiments.

Figure 17:
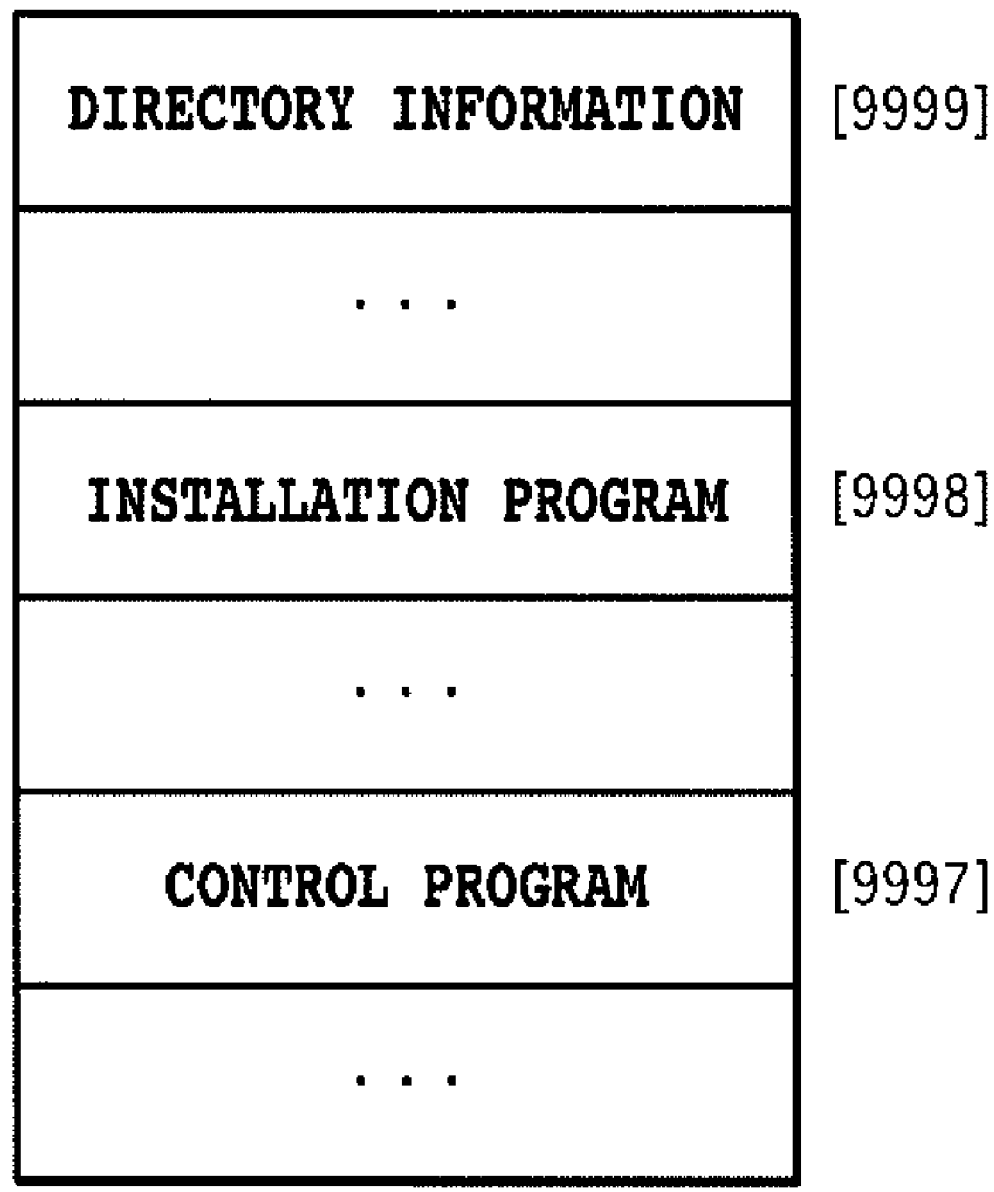
FIG. 17 is a schematic diagram showing a memory map of a CD-ROM, an example of a storage medium.

FIG. 17 is a diagram showing a memory map of a CD-ROM, an example of the storage medium. The following is a detailed description about FIG. 17.

The area [9999], which stores directory information, indicates the location of the area [9998] that stores an installation program thereafter, and the location of the area [9997] that stores the control program of the image forming apparatus. The area [9998] is the area that stores the installation program. The area [9997] is the area that stores the control program of the image forming apparatuses 10, 20, and 30. To install the control program of the image forming apparatus in accordance with the present invention in the image forming apparatuses 10, 20, and 30, the installation program stored in the area [9998] that stores the installation program is loaded into the image processing apparatus. Then, the CPU 301 executes the installation program. Subsequently, the installation program executed by the CPU 301 reads the control program of the image forming apparatus from the area [9997] that stores the image forming apparatus control program. Then, the CPU 301 rewrites the contents of the ROM 303 or installs it in the HDD 304. In this case, the ROM 303 must be a rewritable ROM such as a flash ROM rather than a plain mask ROM.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-074785, filed Mar. 22, 2007, which is hereby incorporated by reference herein in its entirety.

What is claimed is:

1. An image processing apparatus comprising:
   a decoding unit configured to extract information by decoding a code image contained in an original document image;
   a decision unit configured to make a decision according to selection of a user as to whether to output the original document image or the information extracted by said decoding unit;
   a user authentication unit configured to identify the user;
   a judging unit configured to judge according to the information extracted by said decoding unit as to whether the identified user can access the information extracted by said decoding unit; and
   a display unit configured to display a display screen for causing the user to select, when said judging unit judges that the information is accessible, whether to output the original document image or the information extracted by said decoding unit.

2. The image processing apparatus as claimed in claim 1, wherein said decision unit makes a decision according to the selection of the user as to whether to output the original document image, or the information extracted by said decoding unit, or the original document image and the information extracted by said decoding unit.

3. The image processing apparatus as claimed in claim 1, wherein said display unit displays, when said judging unit judges that the information is inaccessible, a display screen for preventing the user from selecting the information extracted by said decoding unit to be output.

4. An image processing method comprising:
   a decoding step of extracting information by decoding a code image contained in an original document image;
   a decision step of making a decision according to selection of a user as to whether to output the original document image or the information extracted by the decoding step;
   a user authentication step of identifying the user;
   a judging step of judging according to the information extracted by the decoding step as to whether the identified user can access the information extracted by the decoding step; and
   a display step of displaying a display screen for causing the user to select, when the judging step judges that the information is accessible, whether to output the original document image or the information extracted by the decoding step.

5. The image processing method as claimed in claim 4, wherein the decision step makes a decision according to the selection of the user as to whether to output the original document image, or the information extracted by the decoding step, or the original document image and the information extracted by the decoding step.

6. The image processing method as claimed in claim 4, wherein the display step displays, when the judging step judges that the information is inaccessible, a display screen for preventing the user from selecting the information extracted by the decoding step to be output.

* * * * *